July 2, 1940.  C. J. KINZIE ET AL  2,206,287
ZIRCONIUM OXIDE AND METHOD OF MAKING SAME
Filed Feb. 2, 1937  2 Sheets-Sheet 1

INVENTORS.
CHARLES J. KINZIE
DONALD S. HAKE
BY
ATTORNEY.

July 2, 1940.  C. J. KINZIE ET AL  2,206,287
ZIRCONIUM OXIDE AND METHOD OF MAKING SAME
Filed Feb. 2, 1937  2 Sheets-Sheet 2
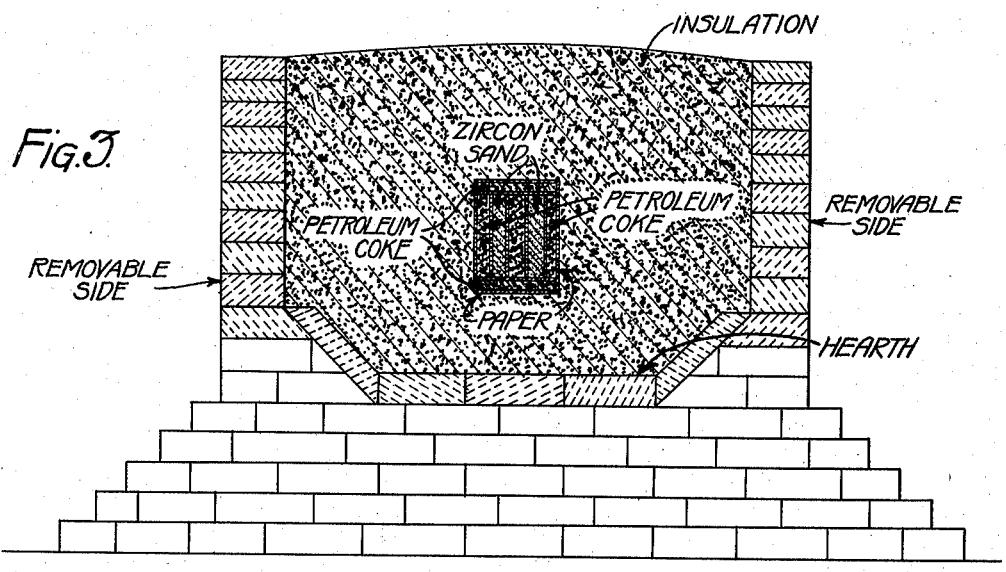
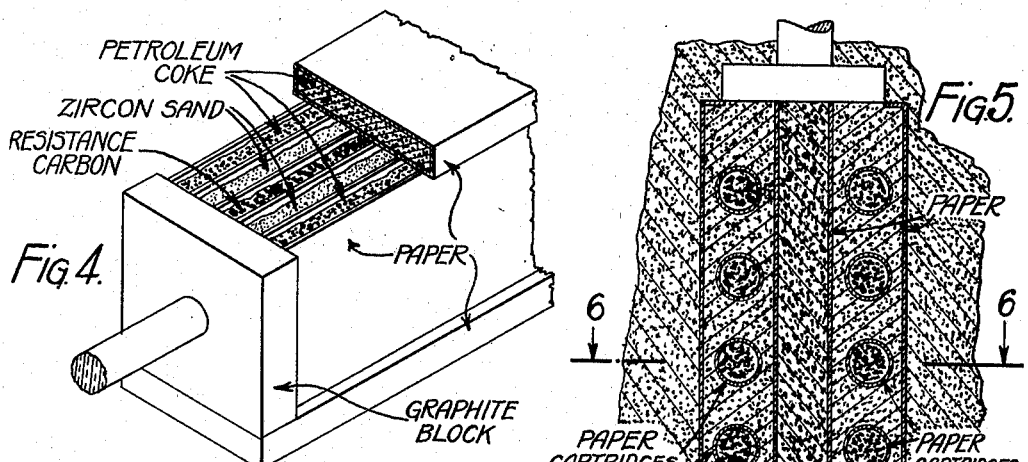
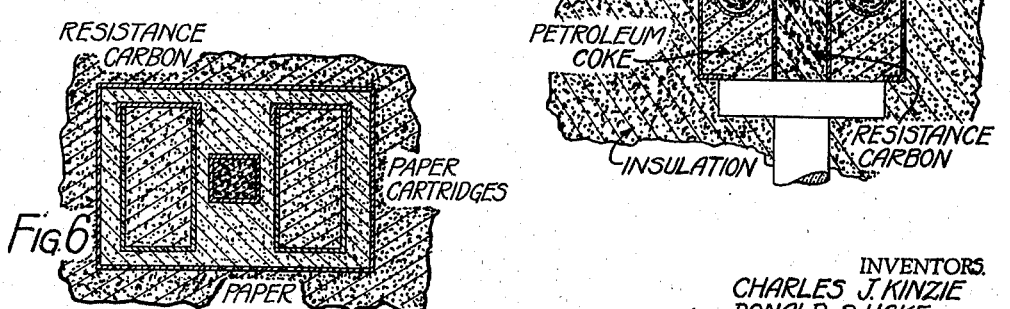
INVENTORS.
CHARLES J. KINZIE
DONALD S. HAKE
BY
ATTORNEY.

Patented July 2, 1940

2,206,287

UNITED STATES PATENT OFFICE 2,206,287

ZIRCONIUM OXIDE AND METHOD OF MAKING SAME

Charles J. Kinzie and Donald S. Hake, Niagara Falls, N. Y., assignors to The Titanium Alloy Manufacturing Company, New York, N. Y., a corporation of Maine Application February 2, 1937, Serial No. 123,588

16 Claims. (Cl. 23—21)

Our invention relates more particularly to the production of synthetic baddeleyite of a particle size range and degree of purity heretofore nonexistent either in nature or in various manufactured zirconium oxides. We accomplished this improved result in the electric resistance furnace with the incidental production of silicon carbide as a by-product.

Our invention consists primarily in the discovery that from zircon ($ZrSiO_4$), an essentially silicon-free crystalline zirconium oxide in the form of a substantially chemically pure synthetic baddeleyite may be made, while at the same time volatilizing essentially all the iron contained in the zircon. While accomplishing this result, there is also formed in the same furnace a substantial yield of silicon carbide, a portion of which may be the product of the silicon volatilized from the zircon, while the remaining portion of such silicon carbide is produced in the insulating mix consisting preferably of petroleum coke, silica sand and sawdust by the absorption of waste heat from the zirconium reaction zone or inner zone of the furnace.

Heretofore in the production of zirconium oxide, science has had to depend upon various relatively complicated chemical separations involving preliminary fusions of zircon with alkali and subsequent treatments with acid and various other later steps, such as crystallization, in order to separate the zirconium oxide from combined and other impurities such as silica which is combined with zirconia in the zircon ($ZrSiO_4$).

Other impurities such as iron, titanium, rare earth compounds, etc., have also been separated from the zirconium-containing materials only by relatively complicated procedures.

According to our improved methods the zirconium-containing material is at no stage brought into solution, nor is the raw zirconium material decomposed or altered by the aid of fusion or other decomposing agents.

As a result of our discoveries upon which claims for our new and improved product are based, we obtain a zirconium oxide in form of crystals and crystal aggregates of particle size heretofore unknown either in nature or in any of the manufactured zirconia products.

The optical constants, crystal structure and X-ray diffraction patterns are those of $ZrO_2$ "baddeleyite," but differ from known products in particle size as well as in purity.

Natural baddeleyite cannot be used for refractories for temperatures above 1800° to 2000° C. due to the fact that the impurities therein result in deterioration under heat, while manufactured zirconium oxides are unsuited for a variety of reasons; in some the particle size is such as to result in excessive shrinking upon heating, while in others traces of carbides result in expansion.

Our new and improved zirconium oxide, in form of the novel particle size range, fabricates directly into very dense refractory shapes having upon heating to very high temperatures practically no shrinkage, and having also a very high melting point by virtue of its freedom from impurities; and being free of carbides it does not tend to expand and disrupt upon heating.

This result is obtained by heating practically pure zircon ($ZrSiO_4$) in form of grains ranging in size from about 30 mesh to 200 mesh in an electric resistance furnace, but out of direct contact with carbon. The zircon is decomposed, the silica is volatilized and completely expelled along with traces of iron and some other impurities including $P_2O_5$, from the residue of zirconia which remains as a slightly sintered aggregate of zirconia crystals, and contains a small amount of zirconium carboxide due to contact of the zircon charge with adjacent carbon and possibly, also, to a slight effect of carbon gases. The product herein claimed is then formed by calcining the zirconia furnace discharge in air to oxidize the small amount of zirconium carboxide to extremely fine $ZrO_2$, and then removing same from the relatively coarse desired $ZrO_2$ by any suitable means, such as air classification, elutriation, etc., after reducing the product to about 40 mesh.

This new artificially prepared baddeleyite (zirconium oxide) is in the form of a dense crystalline material, and as so produced constitutes an excellent base for making superrefractory material and articles of zirconia.

By subjecting our product to finishing processes such as described in U. S. Patent 1,588,476 dated June 15, 1926, to Kinzie, an excellent white opacifying pigment for vitreous enamels, glazes and other applications may readily be produced.

The product of our invention, if milled to suitable fineness without any other treatment, is an excellent opacifier pigment that is cream-colored, but is free from the defects of zirconium oxide produced by other electro-thermal processes, such as the presence of dark-colored blemish producing particles not removed by simple oxidation.

Our invention is based, in part on the discovery that by heating zirconium silicate in the absence of carbon in an electric resistance furnace, the silicon compounds are completely volatilized, and in addition iron compounds are also volatilized so as to leave practically only a trace of same in the resultant zirconium oxide product.

Starting with a relatively pure zirconium silicate, there is left a mass consisting of practically pure zirconium oxide. Upon ignition the mass does not change in volume and the small amount of carbon compound present is eliminated so as to leave the zirconium oxide as a cream-colored material.

Of the drawings showing different types of electric furnaces and method of loading same, Fig. 1 is a sectional elevation showing one type of furnace;

Fig. 3 is a section taken on the line 3—3 of Fig. 1;

Fig. 4 is an enlarged perspective view of the granular graphite resistor partly broken away;

Fig. 5 is an enlarged fragmentary horizontal sectional view of a modified form of furnace; and Fig. 6 is a detail enlarged sectional view on the line 6—6 of Fig. 5.

The following example will serve to show how our methods can be practiced to produce this novel zirconium oxide product, and will also include a description of the characteristics and properties which differentiate this product from natural baddeleyite as well as from prior synthetic zirconium oxides.

*Example A.*—The following complete example will serve to show how our methods may be used to produce our new zirconium oxide product and a by-product of silicon carbide (SiC). The furnace as shown in the accompanying drawings was loaded in the following manner.

An insulating mix is first prepared by mixing the following materials:

| | Parts by weight |
|---|---|
| Green petroleum coke | 37 |
| Silicon sand | 55 |
| Wood sawdust | 8 |
| | 100 |

Other forms of carbon may be used in place of petroleum coke such as coal or calcined coal in the form of foundry coke, if desired.

This mixture is charged upon the hearth of the furnace to a depth of about ten inches and leveled off, and then in center over an area of about fifteen inches by six inches a piece of thin tough paper was placed.

The graphite electrodes consist preferably of round one inch by twenty-six inch long pieces, one through each end wall, the exterior ends being suitably connected to the source of electric current, while the ends within the furnace are brought to within thirteen and one-half inches of each other, leaving this thirteen and one-half inch space for the placing of the granular graphite resistor. At each end of the round one inch graphite electrodes is a three inch by three inch by one inch block of graphite to confine the zones of various materials.

The insulation between the blocks of graphite was covered with a sheet of thin tough paper. On this paper was placed a one-half inch layer of granular green petroleum coke, two and one-half inches wide by fifteen and one-half inches long. The layer of petroleum coke was covered with a sheet of paper, and then sheets of thin tough paper were arranged in place so as to form a zone one-half inch wide by three inches high between the electrodes, and into this space granular graphite of one-eighth inch mesh size was placed.

Figure 1:
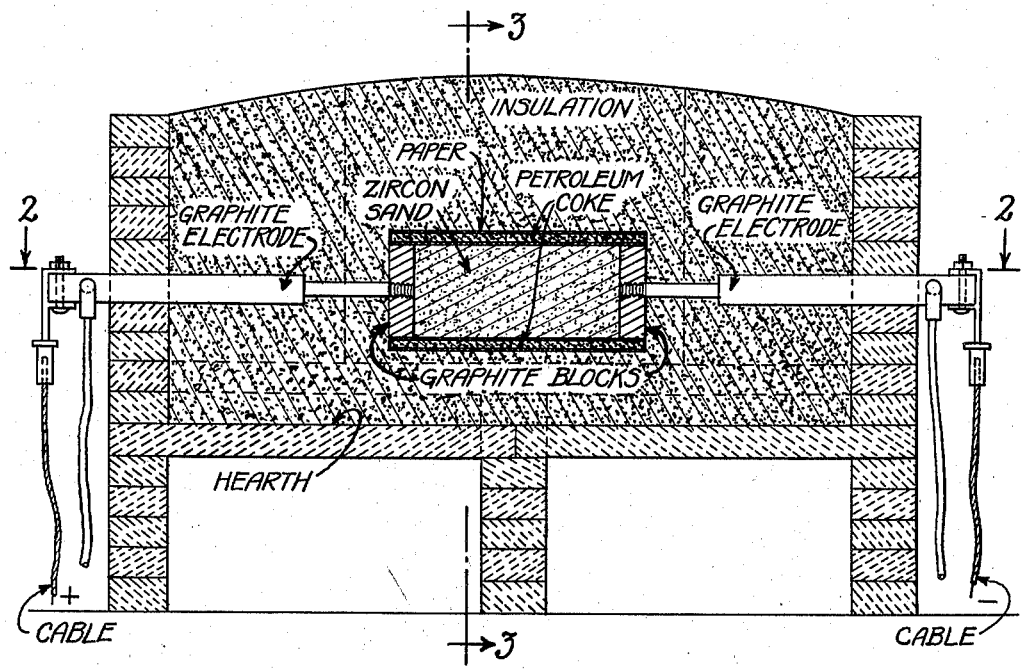
Figure 2:
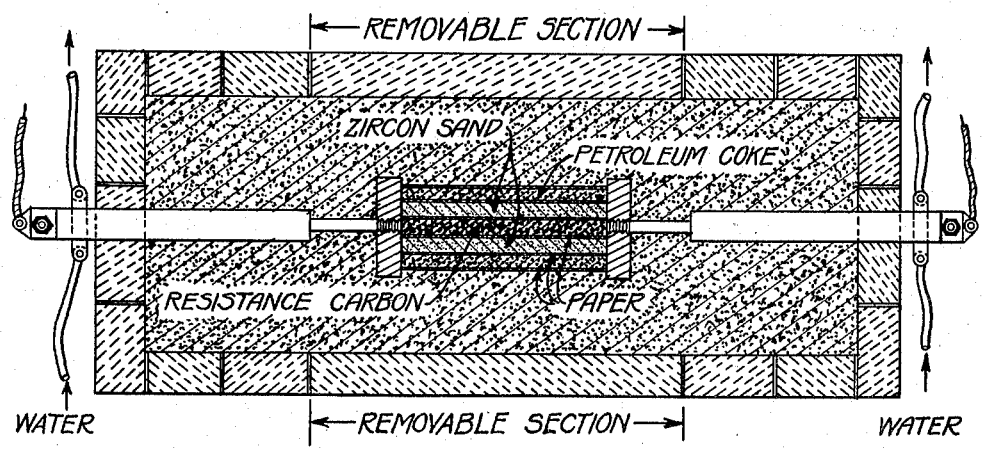
Fig. 2 is a section taken on the line 2—2 of Fig. 1.

Outside the furnace the ends of the graphite electrodes may be cooled by passing a current of water through them as shown in Figs. 1 and 2.

Then sheets of thin tough paper were arranged, one on each side, one-half inch away from the sheets confining the granular graphite core, and these two spaces were filled with zircon sand of the following composition.

| | Per cent |
|---|---|
| Zirconium silicate | 98.50 |
| Iron impurity (calculated as Fe₂O₃) | .01 |
| Titanium impurity (calculated as TiO₂) | .02 |
| Balance impurities such as free SiO₂, rare earths, P₂O₅, etc | 1.47 |
| | 100.00 |

There was then arranged one-half inch away from the paper confining the zircon, other sheets of paper and in the space so formed is placed granular green petroleum coke. A one-half inch layer of granular green petroleum coke was then placed to cover the confined charge as shown in Fig. 4, and the entire remaining space in the furnace was then filled with the mixture of coke, sand and sawdust as used at the bottom (Figs. 1 and 3).

The graphite electrodes extend in through furnace wall, and are connected inside with a one-half inch wide by three inches high by thirteen and one-half inch zone of granular graphite. At each side of this granular graphite core is a zone of zircon sand thirteen and one-half inches long, one-half inch wide, and three inches high. Outside the zircon and graphite resistor zones is an envelope of petroleum coke thirteen and one-half inches long by one-half inch thick.

The granular graphite core, the zircon, and the coke are as a whole temporarily separated from the insulating mix at the bottom, sides and top by layers of paper, and at the ends by the contact blocks of graphite (Figs. 2–4).

The charge is therefore completely surrounded at the bottom, sides, top and ends with approximately twelve inch zone of this insulating charge. The source of power which we used was a laboratory transformer 12 K. V. A. with a secondary voltage range of 2 to 45 volts in steps of 2 volts. A voltmeter and an ammeter were connected and used to measure terminal voltage and secondary current. The current was turned on and the run was of 6½ hours duration, using from 30 to 42½ secondary voltage and an average of about 280 amperes, which developed a temperature sufficiently high to dissociate the ZrSiO₄ and volatilize the silicon as well as to form SiC in the adjacent zones of the furnace. The temperature probably is between about 2200 and 2700° C., probably about 2500° C. in the core.

As the run progressed, the carbon monoxide gas evolved was ignited at various points at the sides, ends and bottom of the furnace. The exterior of the furnace bottom hearth, side walls, or top of the insulating mix were never much above room temperature, and the warmth at these points was mainly the result of the burning of carbon monoxide or other gases purposely ignited from the outside so as to convert same into harmless gases.

After 6½ hours, the current was turned off and furnace and its charge was allowed to cool for about 72 hours.

The top and side insulations were removed thereby exposing an envelope or shell of greenish colored crystals, which upon analysis proved to consist mainly of crystals of silicon carbide (SiC), a well-known abrasive and refractory material. Upon removal of this outer shell of silicon carbide, we found two zones of silicon carbide occupying the zones which formerly consisted of the layers of petroleum coke, this silicon carbide having been formed apparently by the silicon material as it was volatilized from the zircon, which silicon material combined with the coke to form silicon carbide.

In the zone originally filled with the zircon sand we found a friable gray-colored mass consisting of zirconium oxide containing a small amount of zirconium carboxide, the total carbon content of the mass being about 0.10 per cent.

This carboxide and the $ZrO_2$ type resulting from its calcination is undesired, particularly in case of refractories. By crushing the friable gray-colored mass to 40 mesh, calcining in air to oxidize the zirconium carbon compound to oxide, the extremely fine undesired $ZrO_2$ can be removed by simple means such as air classifying, etc., so as to leave the bulk of the product in the form of relatively coarse crystals and aggregates of coarse crystals.

This gray-colored mass upon calcination changed quickly to a cream-colored material without increasing or decreasing noticeably as regards volume, and without materially effecting the structure of the constituent zirconium oxide.

The zirconium oxide so produced contained by analysis:

| | Percent |
|---|---|
| Silicon (calculated as $SiO_2$) | Nil |
| Titanium (calculated as $TiO_2$) | 0.030 |
| Iron (calculated as $Fe_2O_3$) | 0.002 |
| Zirconium oxide | 99.568 |
| Others—rare earths, traces $Al_2O_3$, etc. | 0.400 |
| | 100.000 |

Using the product as herein prepared and described the following observations were made:

A cream-colored granular powder which consists almost exclusively of aggregates of crystals showing lamellar twinning. The lamellae are very rarely more than .02 mm. long, and the bulk of them are .005 to .015 mm. in length. The refractive index, is $\gamma-2.20$ and $\alpha-2.12$, which are characteristic of baddeleyite.

A trace of other grains are present. These consist of crystals too minute to determine in a matrix that is either glassy or too minutely crystalline to resolve microscopically. The aggregate refractive index is somewhat variable and definitely, but not greatly, lower than for the coarse crystals namely, about 2.0.

The above crystal size observations were of course those of clearly individual crystal aggregates in the larger masses and separate crystals in the smaller size range were observed by means of a microscope equipped with a camera. A photograph was made of a micrometer representing definite dimensions and separate photographs were made of a number of mounts of our product at same magnification as that used in photographing the micrometer. By using a piece of transparent Cellophane, the micrometer print lines were lined on the Cellophane sheet over the photographs of $ZrO_2$ particles and it was possible to measure as well as count the particles in a field. This method we have used to advantage in particle size determination and find it quite reliable.

Based on this method the following numerical count as representing the number of each size particle present in this product was obtained and based on this numerical count the particle size distribution in terms of percent by weight was calculated, both results are presented in the following:

| Size range | Mean size | Numerical count | Percent by weight |
|---|---|---|---|
| Microns | | Percent | Percent |
| 1 to 10 | 5 | 23.5 | 0.15 |
| 10 to 20 | 15 | 32.1 | 5.66 |
| 20 to 30 | 25 | 28.2 | 23.09 |
| 30 to 40 | 35 | 10.2 | 23.04 |
| 40 to 60 | 50 | 5.1 | 33.58 |
| 60 to 80 | 70 | 0.9 | 14.48 |
| | | 100.0 | 100.00 |

Our new product then consists of zirconium oxide of the crystal size as shown by the microscope and in the state of aggregation as expressed by the foregoing particle size distribution, chemical purity, etc.

X-ray studies have been made comparing the $ZrO_2$ product of this case with the $ZrO_2$ of our companion case filed March 1, 1934, Serial No. 713,536, now Patent 2,110,733, and with a reagent form of $ZrO_2$ which is commonly used.

The diffraction pattern of $ZrO_2$ of our Patent 2,110,733, Serial No. 713,536, gave broad $ZrO_2$ lines showing presence of $ZrO_2$ particles too small to be clearly seen with the microscope. The diffraction pattern of $ZrO_2$ of this case showed that the particles were almost exclusively those of $ZrO_2$ of such size as to be easily determinable with the microscope. The diffraction lines of the reagent $ZrO_2$ agreed with lines of the $ZrO_2$ product as our companion case, except that in the pattern for the reagent $ZrO_2$, a few faint lines showed not seen in others and were presumably due to impurities not present in the respective $ZrO_2$ products of this and our Patent 2,110,733, Serial No. 713,536.

Hence by combining the evidence of chemical analysis the microscope, and the X-ray films, we conclude and assert that the $ZrO_2$ of this case consists almost wholly of crystals of baddeleyite of such sizes as to be determinable with the microscope, and that the $ZrO_2$ claimed in our Patent 2,110,733 consists of a mixture of minute crystals of $ZrO_2$ in glass. Since the analysis shows mainly $ZrO_2$, then the glass in which minute $ZrO_2$ crystals have formed is a pure $ZrO_2$ glass or vitreous $ZrO_2$ as set forth in our Patent 2,110,733.

By way of comparison the following chemical analysis of what must have been a carefully selected specimen of baddeleyite, the purest found in nature in pebble form, was as follows (Mellor's Treatise Inorganic Chemistry, vol. VII, pages 122, 123, Titanium, Zirconium, etc.):

| | Percent |
|---|---|
| $ZrO_2$ | 96.52 |
| $SiO_2$ | 0.70 |
| $Al_2O_3$ | 0.43 |
| $Fe_2O_3$ | 0.41 |
| CaO | 0.55 |
| MgO | 0.10 |
| NaKO | 0.42 |
| Loss on ignition | 0.39 |

Mellor also states that the pebbles of baddeleyite from Brazil classified and showed the analyses as follows:

| | Red and friable | Pale red and hard | Reddish black hard | Gray and very dense | Vitreous and glassy |
|---|---|---|---|---|---|
| $ZrO_2$ | 80.54 | 87.99 | 88.97 | 93.12 | 95.46 |
| $SiO_2$ | 6.21 | 5.89 | 5.87 | 3.06 | 1.35 |
| $TiO_2$ | 0.12 | 0.74 | 0.96 | 0.69 | 0.76 |
| $Al_2O_3$ | 9.03 | 3.78 | 3.54 | 3.03 | 2.84 |
| Ign. loss | 2.01 | 0.54 | 0.51 | 0.07 | |

Therefore it is obvious that the processes in nature have never produced a zirconium oxide even remotely approaching our improved zirconium oxide in purity.

All natural forms of $ZrO_2$ as shown in Mellor start to melt at 2000° C., and are limited in their refractory properties due to the associated impurities, while our new pure synthetic mineral has the very high melting point of the pure oxide viz: 2700–2900° C. The purest natural form of baddeleyite, even when finely milled, is at best a brown-colored material which cannot be used to bring about the pure white effect which our novel synthetic $ZrO_2$ produces when embodied in enamels, glazes and general pigmenting applications.

This Example A shows that by means of our new methods a pure synthetic baddeleyite ($ZrO_2$) may be produced directly from $ZrSiO_4$, and that the silicon evolved has been converted to the useful silicon carbide, while the heat after accomplishing its major function has been effectively used to form additional silicon carbide from the inner zones of insulating mix.

We do not wish to confine our methods of charging the furnace to that specifically described in foregoing Example A. For instance, the zircon may be placed below and above the core of granular graphite as well as at the sides.

The zircon may also be arranged in suitable containers such as paper or cardboard cartridges which are placed adjacent the core and are surrounded with coke. Graphite or carbon containers may likewise be used to hold the zircon charge, and may be simply removed and discharged after the reaction is over and the charge cooled.

We do not wish to confine ourselves to the use of granular carbon as the core material; any suitable conductor, such as graphite or carbon rods or mixture of same, may be used as the resistor with satisfactory results.

In case it is desired to burn out the small amount of carbonaceous material the furnace may be opened while charge is still hot and the small amount of carbon compounds allowed to oxidize in air of its own heat.

To the best of our knowledge we have discovered and produced an improved zirconium oxide suitable as a refractory material for high temperatures; also for use as an opacifier in enamels, etc. as well as a practical chemically pure reagent etc. $ZrO_2$ which has been produced directly from zircon without chemical or fusion treatments.

We have thereby not only effected a marked advance in the zirconium art by way of producing a novel pure zirconium oxide at a cost much lower than for all other zirconium oxide processes, but also have additionally produced silicon carbide in the same furnace which additionally reduces the cost, since this SiC is also a useful product.

In addition to being suitable as a high temperature refractory an opacifier and as a pure zirconium constituent for glass and enamel compounding, our new synthetic zirconium oxide product is a useful material in the production of pure zirconium compounds, sulphates, fluorides, etc., since unlike the zircon ($ZrSiO_4$) from which it was made, our new and improved zirconium oxide is soluble in concentrated sulphuric and hydrofluoric acids.

Related subject matter is disclosed and claimed in our Patent 2,072,889, issued March 9, 1937.

We claim as our invention:

1. A calcined essentially silicon-free crystalline zirconium oxide in the form of synthetic baddeleyite obtained by the electrothermic decomposition of zirconium silicate without being in intimate contact with carbon with substantially complete expulsion of silicon compounds and consisting of a granular product composed of more than 99.50% $ZrO_2$ and traces of iron and titanium, the crystal particles and aggregates thereof being microscopically determinable and having a particle size range from 5 to 80 microns with a melting point between 2700° to 2900° C.

2. A calcined essentially silicon-free crystalline zirconium oxide in the form of synthetic baddeleyite obtained by the electrothermic decomposition of zirconium silicate without being in intimate contact with carbon with substantially complete expulsion of silicon compounds and consisting of more than 99.50% $ZrO_2$ and traces of iron and titanium, and characterized as being a granular cream-colored powder, the crystal particles and aggregates thereof being microscopically determinable and having a particle size range from 5 to 80 microns with a melting point between 2700° and 2900° C.

3. A calcined essentially silicon-free crystalline zirconium oxide in the form of synthetic baddeleyite obtained by the electrothermic decomposition of zirconium silicate without being in intimate contact with carbon with substantially complete expulsion of silicon compounds and consisting of a granular product composed of more than 99.50% $ZrO_2$ and traces of iron and titanium and showing lamellar twinning ranging from 0.005 to 0.02 mm. in length, the crystal particles and aggregates thereof being microscopically determinable and having a particle size range from 5 to 80 microns with a melting point between 2700° and 2900° C.

4. A calcined essentially silicon-free crystalline zirconium oxide in the form of synthetic baddeleyite obtained by the electrothermic decomposition of zirconium silicate without being in intimate contact with carbon with substantially complete expulsion of silicon compounds and consisting of more than 99.50% $ZrO_2$ and traces of iron and titanium, and characterized as being a granular cream-colored powder, and showing lamellar twinning ranging from 0.005 to 0.02 mm. in length, the crystal particles and aggregates thereof being microscopically determinable and having a particle size range from 5 to 80 microns with a melting point between 2700° and 2900° C.

5. A calcined essentially silicon-free crystalline zirconium oxide in the form of synthetic baddeleyite obtained by the electrothermic decomposition of zirconium silicate without being in intimate contact with carbon with substantially complete expulsion of silicon compounds and consisting of a granular product composed of more than 99.50% $ZrO_2$, the crystal particles and aggregates thereof being microscopically determinable and having a particle size range from 5 to 80 microns with traces of iron and not over 0.10% of titanium with a melting point between 2700° and 2900° C.

6. A calcined essentially silicon-free crystalline zirconium oxide in the form of synthetic baddeleyite obtained by the electrothermic decomposition of zirconium silicate without being in intimate contact with carbon with substantially complete expulsion of silicon compounds and consisting of a granular product composed of more than 99.50% $ZrO_2$ and showing lamellar twinning ranging from 0.005 to 0.02 mm. in length, the crystal particles and aggregates thereof being microscopically determinable and having a particle size range from 5 to 80 microns with traces of iron and not over 0.10% of titanium with a melting point between 2700° and 2900° C.

7. A calcined substantially chemically pure synthetic baddeleyite obtained by the electrothermic decomposition of zirconium silicate without being in intimate contact with carbon with substantially complete expulsion of silicon compounds and consisting of crystals and aggregates thereof being microscopically determinable and having a particle size range from 5 to 80 microns with a melting point between 2700° and 2900° C.

8. A calcined substantially chemically pure synthetic baddeleyite obtained by the electrothermic decomposition of zirconium silicate without being in intimate contact with carbon with substantially complete expulsion of silicon compounds and consisting of crystals and aggregates thereof being microscopically determinable and having a particle size range from 5 to 80 microns with traces of iron and not over 0.10% of titanium with a melting point between 2700° and 2900° C.

9. A calcined substantially chemically pure synthetic baddeleyite obtained by the electrothermic decomposition of zirconium silicate without being in intimate contact with carbon with substantially complete expulsion of silicon compounds and consisting of crystals and aggregates thereof being microscopically determinable and showing lamellar twinning ranging from 0.005 to 0.02 mm. in length and having a particle size range from 5 to 80 microns with a melting point between 2700° to 2900° C.

10. A calcined essentially silicon-free crystalline zirconium oxide in the form of synthetic baddeleyite obtained by the electrothermic decomposition of zirconium silicate without being in intimate contact with carbon with substantially complete expulsion of silicon compounds and with a melting point above 2700° C. and characterized as being a granular cream-colored powder, the crystal particles and aggregates thereof being microscopically determinable and having a particle size range from 5 to 80 microns.

11. A calcined essentially silicon-free crystalline zirconium oxide in the form of synthetic baddeleyite obtained by the electrothermic decomposition of zirconium silicate without being in intimate contact with carbon with substantially complete expulsion of silicon compounds and with a melting point above 2700° C. and characterized as being a granular cream-colored powder, the crystal particles and aggregates thereof being microscopically determinable and having a particle size range from 5 to 80 microns with a titanium content not over 0.10% and traces of iron compounds as an impurity therein.

12. The method of making a crystalline synthetic baddeleyite consisting of more than 99.50% $ZrO_2$ the crystal particles and aggregates thereof having a particle size range from 5 to 80 microns from zirconium silicate, which comprises subjecting said zirconium silicate to electrothermic decomposition without being in intimate contact with carbon with substantially complete expulsion of silicon compounds, crushing the zirconium oxide residue to about 40 mesh and calcining same to convert the small amount of zirconium-carbon compounds therein to ultra-microscopic zirconium oxide grains, and then separating said grains from the relatively coarse crystalline synthetic baddeleyite of said specified particle size.

13. The method of making a crystalline synthetic baddeleyite consisting of more than 99.50% $ZrO_2$ the crystal particles and aggregates thereof having a particle size range from 5 to 80 microns from zirconium silicate, which comprises subjecting said zirconium silicate to electrothermic decomposition without being in intimate contact with carbon with substantially complete expulsion of silicon compounds, crushing the zirconium oxide residue to about 40 mesh and calcining same under oxidizing conditions to convert the small amount of zirconium-carbon compounds therein to ultra-microscopic zirconium oxide grains, and then separating said grains from the relatively coarse crystalline synthetic baddeleyite of said specified particle size.

14. The method of making a crystalline zirconium oxide from zirconium silicate which comprises heating said silicate enveloped in an insulating mix in an electric resistance furnace with substantially complete expulsion of silicon compounds, crushing the resulting mass to about 40 mesh, and calcining the mass so as to produce a granular product composed of microscopically determinable crystals consisting of said zirconium oxide more than 99.50% $ZrO_2$ in the form of synthetic baddeleyite with traces of titanium and iron therein consisting of microscopically determinable crystal particles and aggregates having a particle size range of from 5 to 80 microns.

15. The method of making a crystalline zirconium oxide from zirconium silicate which comprises heating said silicate without being in intimate contact with carbon and enveloped in an insulating mix in an electric resistance furnace with substantially complete expulsion of silicon compounds, crushing the resulting mass to about 40 mesh, and calcining the mass so as to produce a granular product composed of microscopically determinable crystals consisting of said zirconium oxide more than 99.50% $ZrO_2$ in the form of synthetic baddeleyite with traces of titanium and iron therein consisting of microscopically determinable crystal particles and aggregates having a particle size range of from 5 to 80 microns.

16. The method of making a crystalline zirconium oxide compound from crude zircon which comprises heating said zircon enveloped in, but without being in intimate contact with, a carbonaecous reducing agent in an electric resistance furnace with substantially complete expulsion of silicon and iron compounds, then removing the silicon carbide formed, crushing the resulting mass to about 40 mesh, and calcining the resulting material under oxidizing conditions to convert the bulk thereof into a crystalline zirconium oxide compound in the form of synthetic baddeleyite substantially free from silicon and having a titanium content not over 1% consisting of microscopically determinable crystal particles and aggregates having a particle size range of from 5 to 80 microns.

CHARLES J. KINZIE.
DONALD S. HAKE.